United States Patent
Kowalski et al.

(10) Patent No.: US 6,536,595 B2
(45) Date of Patent: Mar. 25, 2003

(54) MINERAL ORE FLOTATION AID

(75) Inventors: Corey J. Kowalski, Kingsford, MI (US); Russell A. Smith, Eveleth, MN (US); Donald C. Roe, Jamison, PA (US)

(73) Assignee: GE Betz, Inc., Trevose, PA (US)

( * ) Notice: Subject to any disclaimer, the term of this patent is extended or adjusted under 35 U.S.C. 154(b) by 44 days.

(21) Appl. No.: 09/847,125

(22) Filed: May 2, 2001

(65) Prior Publication Data

US 2002/0185415 A1 Dec. 12, 2002

(51) Int. Cl.⁷ .......................... B03D 1/014; B03D 1/02; B03D 1/008; B03D 1/01; B03D 1/012
(52) U.S. Cl. .................. 209/166; 209/167; 252/61
(58) Field of Search ............................. 209/166, 167; 252/61

(56) References Cited

U.S. PATENT DOCUMENTS

| 3,804,243 A | * | 4/1974 | Yang |
| 3,960,715 A | | 6/1976 | Dicks et al. |
| 4,148,720 A | | 4/1979 | Wang et al. |
| 4,274,945 A | | 6/1981 | Goodman et al. |
| 4,319,987 A | | 3/1982 | Shaw et al. |
| 4,515,687 A | | 5/1985 | Bresson et al. |
| 4,518,491 A | * | 5/1985 | Bilimoria et al. |
| 4,900,451 A | | 2/1990 | Brown et al. |
| 5,053,119 A | * | 10/1991 | Collins et al. |
| 5,078,891 A | | 1/1992 | Sherwood et al. |
| 5,178,774 A | | 1/1993 | Payne et al. |
| 5,244,155 A | | 9/1993 | Klimpel et al. |
| 5,307,938 A | | 5/1994 | Lillmars |

FOREIGN PATENT DOCUMENTS

| GB | 2156819 | * | 10/1985 |
| SU | 818653 | * | 4/1981 |
| SU | 1176955 | * | 9/1985 |

* cited by examiner

Primary Examiner—Thomas M. Lithgow
(74) Attorney, Agent, or Firm—Steven D. Boyd

(57) ABSTRACT

In accordance with the present invention, there is provided a method of improving the separation of mineral values from their associated gangue. The method itself involves the addition of an effective amount of a treatment reagent to the froth flotation process which enhances the ore recovery. The treatment reagents of the method of the present invention comprise water-soluble organophosphonates which when added to the flotation feed slurry enhance the recovery of ore values thertefrom. The organophosphonate treatment reagent may be used alone or in combination with a polymeric dispersant.

12 Claims, No Drawings

MINERAL ORE FLOTATION AID

FIELD OF THE INVENTION

The present invention relates to the production of mineral ore, particularly from low-grade ore bodies. The mineral ore such as iron ore is recovered from an aqueous slurry via a flotation process.

BACKGROUND OF THE INVENTION

Mineral ores such as iron ore are obtained from deposits referred to as either high or low-grade deposits. Froth flotation is a process for recovering and concentrating minerals from ores. In a froth flotation process, the ore is wet ground to obtain a pulp. Additives such as collector agents, frother agents, depressants, activators, etc. are added to the pulp to assist in separating valuable minerals from undesirable gangue portions of the ore in subsequent flotation steps. The pulp is then aerated to produce a froth at the surface. The materials which adhere to the bubbles or froth are collected as concentrates. Selective suppressants or depressants inhibit the adhesion of the certain minerals to the bubbles or froth, thus assisting in the separation of the froth products from the desirable products which can include those minerals suppressed by the suppressant agent. The froth product or the reject product or both can then be further processed to obtain the desired minerals, such as by additional flotation stages. Generally, the ore is initially floated to produce a rougher concentrate, the rougher concentrate thereafter being re-floated in the presence of suppressants or collector agents to further separate the minerals therein. Typical mineral flotation collector agents include sulfydryl collector agents such as xanthate and fatty acid based collector agents such as sodium oleate.

SUMMARY OF THE INVENTION

The present invention provides a process for the selective separation of ore values when a ground mineral ore containing gangue material is first dispersed in an aqueous medium and thereafter conditioned with an effective amount of a treatment reagent whereby the recovery of ore from a froth flotation process is increased. The treatment reagent of the present invention is a water-soluble organophosphonate which is used alone or preferably in combination with a polymeric dispersant.

DETAILED DESCRIPTION OF THE PREFERRED EMBODIMENT

In accordance with the present invention, there is provided a method of improving the separation of mineral values from their associated gangue. The present invention will be described with respect to flotation recovery of iron ore values from its associated gangue. It is believed that this method is also compatible with other ore recovery systems wherein mineral values are selectively separated from their associated gangue. The method itself involves the addition of an effective amount of a treatment reagent to the froth flotation process which enhances the ore recovery. By "effective amount" of the reagent it is meant that amount of the reagent that is effective in producing the desired degree of increase in the recovery of ore values. The particular amount that is effective will vary depending upon variables such as the particular ore processed, the specific composition of the reagent, etc. Therefore, a precise statement as to the effective amount is not possible. Generally however, the effective amount will arrange from about 0.1 to 100 parts per million reagent in the ore flotation feed slurry.

The treatment reagents of the method of the present invention comprise water-soluble organophosphonates which when added to the flotation feed slurry enhance the recovery of ore values therefrom. Examples of acceptable organophosphonates include hydroxyethylidenediphosphonic acid (HEDP), diethylenetriamine penta-(methylene phosphonic acid) (DETA), aminotri(methyphosphonic acid) (AMP), hexamethylenediaminetetra(methyphosphonic acid) (HMDTMP), ethylenediaminetetra(methylenephosphonic acid) (EDTMP), 2-phosphonobutane-1,2,4-tricarboxylic acid (PBTC), hydroxypropyldiphosphonic acid (HPDP) or blends thereof. Such organophosphonates may be added to the systems in an amount of from about 0.1 to about 100 parts per million. The organophosphonate treatment reagent may be used alone or in combination with a polymeric dispersant.

Suitable polymeric dispersants within the scope of the present invention comprised water-soluble polymers having the structure:

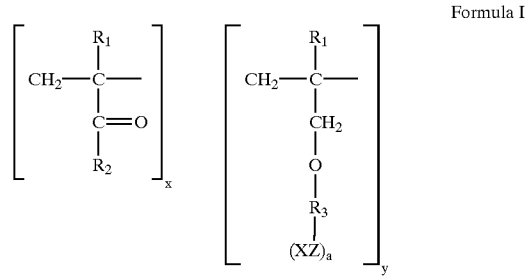

Formula I wherein $R_1$ is H or lower alkyl ($C_1$–$C_3$): $R_2$ is OH or OM, or $NH_2$; M is a water-soluble cation, $R_3$ is a hydroxy substituted alkyl or alkaline radical having from 1 to 6 carbon atoms or a nonsubstituted alkyl or alkylene radical having from 1 to 6 carbon atoms; X, when present, is an anionic radical selection from the group consisting of $SO_3$, $PO_3$, $PO_4$, and COO, Z when present, is H or hydrogens or any water soluble cation or cations which together counterbalances the valence of the anionic radicals, a is 0 or 1.

The number average molecular weight of the water-soluble copolymers of Formula I may fall within the range of 1,000 to 1,000,000. Preferably the number average molecular weight will be within the range from 1,500 to 500,000 with the range of about 1,500 to about 10,000 being even more highly desirable. The key criterion is that the polymer be water-soluble.

The molar ratio x:y of the monomers of Formula 1 may fall within the range of between about 30:1 to 1:20, with the x:y molar ratio range of from about 10:1 to 1:5 being preferred.

At present, the water-soluble polymer preferred for use in the present invention is:

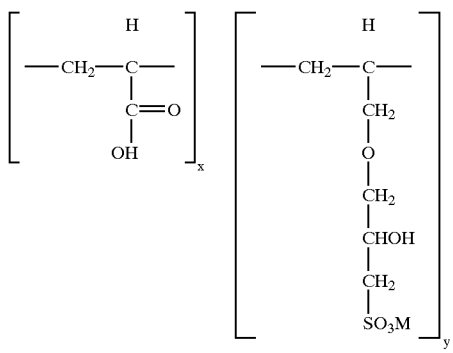

Formula II wherein M is the same as given in Formula 1. This polymer (Formula II) is referred to as acrylic acid-/allyl hydroxy propyl sulfonate ether (AA/AHPSE). The IUPAC nomenclature for AHPSE is 1-propane sulfonic acid, 2-hydroxy-3-(2-propenyl oxy)-mono sodium salt.

The treatment reagent used in the method of the present invention is added to the ore flotation feed slurry, preferably as an aqueous solution. The treatment reagent can be added to the ore flotation feed slurry to provide a concentration of from about 0.1 to 100 parts per million, preferably from about 1 to 10 parts per million in the treatment slurry. When a combination of organophosphonate and polymeric dispersant is employed, the ratio of organophosphonate to polymeric dispersant can range from about 20 to 1 to about 1 to 5, preferably about 5 to 1.

The present invention will now be further described with reference to a number of specific examples which are to be regarded as illustrative and not as restricting the scope of the present invention. All percentages stated herein are by weight.

EXAMPLES

Laboratory flotation tests were conducted on an iron ore flotation feed slurry using a conventional amine separation agent and alcohol frother reagent chemistries and feed rates. An organophosphonate (HEDP), a polymeric dispersant (AA/AHPSE), and a blend of 51% HEDP and 6% AA/AHPSE were tested. Table 1 summarizes the results of the testing.

TABLE 1

| Treatment Reagent | Dosage | % Iron Recovery | % change in Iron Recovery |
| --- | --- | --- | --- |
| None (control) | 0 | 97.350 | 0 |
| A | 1 | 97.15 | −0.21 |
| A | 5 | 97.402 | 0.05 |
| A | 10 | 97.915 | 0.58 |
| B | 1 | 97.325 | −0.03 |
| B | 5 | 97.475 | 0.13 |
| B | 10 | 97.225 | −0.12 |
| A + B | 1 | 97.489 | 0.14 |
| A + B | 5 | 97.604 | 0.26 |
| A + B | 10 | 98.026 | 0.69 |

Reagent A = hydroxyethylene diphosphonic acid
Reagent B = acrylic acid/allyl 2-hydroxypropyl sulfonate ether
3 to 1 ratio (available as ScaleTrol ® PDC9311 from BetzDearborn Inc., Trevose, PA)

The data in Table 1 shows that the organophosphonate HEDP both alone and in combination with a polymeric dispersant provides for an increase in iron recovery in a froth flotation system. It also appears that a combination of HEDP and a polymeric dispersant provides for a more than additive improvement in iron recovery.

While the exact mechanism of the present invention is not clear, it is believed that inhibition of deposition of calcium carbonate and other sparingly soluble salts could be a factor. For example, it is theorized that if calcium carbonate and other salts precipitate on the surface of iron particles, they may be collected by the amine flotation agent and floated with the silica and other gangue. By inhibiting the precipitation of such salts, the iron particles would maintain a clean surface and stay with the concentrate thereby increasing iron recovery. Other mechanisms are possible such as the selective absorption of phosphonates and or phosphonate/polymer blend on nonferrous sites on the iron particles thereby preventing absorption of the amine flotation agent and subsequent flotation with the gangue material. Regardless of the actual mechanism involved, the data in Table 1 clearly evidences the improved iron recovery which results from treatment of an ore flotation feed slurry in accordance with the present invention. In addition to enhancing iron ore flotation recovery, it is believed that the froth flotation reagent of the method of the present invention would provide similar benefits in other froth flotation processes. For example, phosphate flotation as well as other metallic ore flotation processes which utilize a reverse flotation scheme.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method for separating mineral ore from gangue via froth flotation including the steps of forming an aqueous mixture of mineral component and gangue, adding thereto an effective amount of a treatment reagent comprising an organophosphonate and a polymeric dispersant comprises a co-polymer the formula:

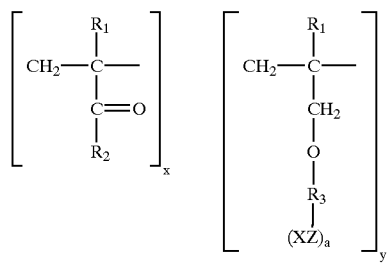

wherein $R_1$ is H or lower alkyl ($C_1$–$C_3$): $R_2$ is OH or OM, or $NH_2$; M is a water-soluble cation, $R_3$ is a hydroxy substituted alkyl or alkaline radical having from 1 to 6 carbon atoms or a nonsubstituted alkyl or alkylene radical having from 1 to 6 carbon atoms; X, when present, is an anionic radical selection from the group consisting of $SO_3$, $PO_3$, $PO_4$, and COO, Z when present, is H or hydrogens or any water soluble cation or cations which together counterbalances the valence of the anionic radicals, a is 0 or 1, and x:y ranges from about 30:1 to 1:20 in a concentration of from about 0.1 to 100 parts per million said aqueous mixture and subjecting the aqueous mixture to a settling and/or decanting separating processes.

2. The method of claim 1 wherein said organophosphonate is selected from the group consisting of hydroxyethylidenediphosphonic acid, diethylenetriamine penta-(methylene phosphonic acid), aminotri(methyphosphonic acid), hexamethylenediaminetetra(methyphosphonic acid), ethylenediaminetetra(methylenephosphonic acid), 2-phosphonobutane-1,2,4-tricarboxylic acid, hydroxypropyl-diphosphonic acid or blends thereof.

3. The method of claim 1 wherein said concentration of said organophosphonate is from about 1 to 10 parts per million.

4. The method of claim 1 wherein said mineral ore is iron ore.

5. The method of claim 1 wherein said polymeric dispersant comprises a co-polymer having the formula:

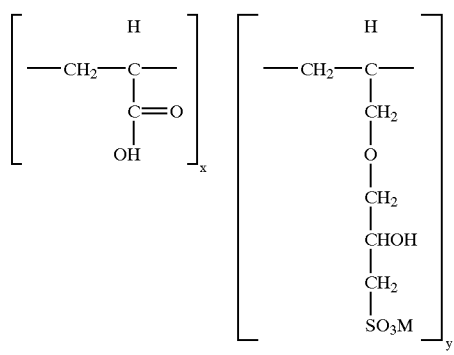

wherein M is a water-soluble cation and x:y ranges from about 30:1 to 1:20.

6. The method of claim 1 wherein the ration of organic phosphonate to polymeric dispersant ranges from about 20 to about 1 to 1 to 5.

7. A method of separating the mineral ore from gangue via froth flotation including the steps of forming and aqueous mixture of mineral component and gangue, adding thereto an effective amount of a treatment reagent comprising an organic phosphonate selected from a group consisting of hydroxyethylidenediphosphonic acid, diethylenetriamine penta-(methylene phosphonic acid), aminotri (methyphosphonic acid), hexamethylenediaminetetra (methyphosphonic acid), ethyleneeiaminetetra (methylenephosphonic acid), 2-phosphonobutane-1,2,4-tricarboxylic acid, hydroxpropyldiphosphonic acid or blends thereof and polymeric dispersant in a ratio of from about 20 to 1 to about 1 to 5.

8. The method of claim 7 wherein said polymeric dispersant comprises a polymer of the formula:

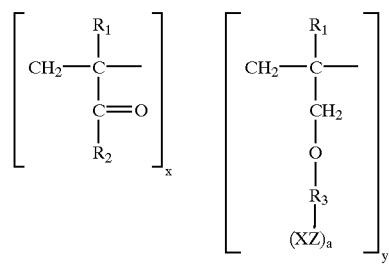

wherein $R_1$ is H or lower alkyl ($C_1$–$C_3$): $R_2$ is OH or OM, or $NH_2$; M is a water-soluble cation, $R_3$ is a hydroxy substituted alkyl or alkaline radical having from 1 to 6 carbon atoms or a nonsubstituted alkyl or alkylene radical having from 1 to 6 carbon atoms; X, when present, is an anionic radical selection from the group consisting of $SO_3$, $PO_3$, $PO_4$, and COO, Z when present, is H or hydrogens or any water soluble cation or cations which together counterbalances the valence of the anionic radicals, a is 0 or 1 and x:y ranges from about 30:1 to 1:20.

9. The method of claim 7 wherein said polymeric dispersant comprises a polymer of the formula:

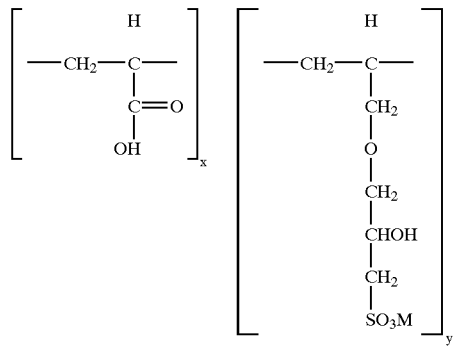

wherein M is a water-soluble cation and x:y ranges from about 30:1 to 1:20.

10. The method of claim 7 wherein said treatment reagent is added to said aqueous mixture in a concentration from about 0.1 to 100 parts per million.

11. The method of claim 7 wherein said treatment reagent is added to said aqueous mixture in a concentration from about 1 to 10 parts per million.

12. The method of claim 7 wherein said ore is iron ore.

* * * * *